United States Patent
O'Donnell et al.

(10) Patent No.: US 10,522,845 B2
(45) Date of Patent: Dec. 31, 2019

(54) BATTERY CENTRIC THERMAL MANAGEMENT SYSTEM UTILIZING A HEAT EXCHANGER BLENDING VALVE

(71) Applicant: Tesla, Inc., Palo Alto, CA (US)

(72) Inventors: Curt Raymond O'Donnell, Sunnyvale, CA (US); Christoph Eisenbarth, El Granada, CA (US); Stefan Forrest Campbell, San Francisco, CA (US); Jacob Edward Oberlin, San Jose, CA (US); Andrew David Baglino, San Francisco, CA (US); Vincent George Johnston, Half Moon Bay, CA (US); Donald Paul Yuhasz, Sunnyvale, CA (US)

(73) Assignee: Tesla, Inc., Palo Alto, CA (US)

( * ) Notice: Subject to any disclaimer, the term of this patent is extended or adjusted under 35 U.S.C. 154(b) by 825 days.

(21) Appl. No.: 13/947,372

(22) Filed: Jul. 22, 2013

(65) Prior Publication Data
US 2013/0298583 A1    Nov. 14, 2013

Related U.S. Application Data

(63) Continuation-in-part of application No. 13/459,112, filed on Apr. 28, 2012.

(60) Provisional application No. 61/539,997, filed on Sep. 28, 2011.

(51) Int. Cl.
| | | |
|---|---|---|
| H01M 6/50 | (2006.01) |
| H01M 10/50 | (2006.01) |
| B60H 1/00 | (2006.01) |
| B60H 1/14 | (2006.01) |
| B60H 1/32 | (2006.01) |
| H01M 10/613 | (2014.01) |

(52) U.S. Cl.
CPC ...... *H01M 6/5038* (2013.01); *B60H 1/00278* (2013.01); *B60H 1/00385* (2013.01); *B60H 1/143* (2013.01); *B60H 1/323* (2013.01); *H01M 10/613* (2015.04); *B60H 2001/00307* (2013.01)

(58) Field of Classification Search
CPC .... B60H 1/143; B60H 1/323; B60H 1/00278; B60H 1/00385; B60H 2001/00307; B60H 2001/00928; H01M 6/5038
See application file for complete search history.

(56) References Cited

U.S. PATENT DOCUMENTS

| | | |
|---|---|---|
| 3,985,110 A | 10/1976 | Doundoulakis |
| 5,035,115 A | 7/1991 | Ptasinski |
| 5,058,391 A | 10/1991 | Periot |
| | (Continued) | |

FOREIGN PATENT DOCUMENTS

DE    19930148 A1    1/2000

*Primary Examiner* — Frantz F Jules
*Assistant Examiner* — Martha Tadesse
(74) *Attorney, Agent, or Firm* — Knobbe, Martens, Olson & Bear, LLP

(57) ABSTRACT

A method of regulating thermal dissipation from a vehicle battery pack is provided in which a by-pass valve is used to control the amount of battery pack coolant either passing through, or by-passing, a heat exchanger, where the coolant passing through the heat exchanger is cooled by a refrigeration system. The vehicle's HVAC system is controlled to insure that HVAC operation does not compromise maintaining the battery pack within an acceptable range of temperatures.

17 Claims, 5 Drawing Sheets

(56) References Cited

U.S. PATENT DOCUMENTS

| | | | |
|---|---|---|---|
| 5,291,960 | A | 3/1994 | Brandenburg et al. |
| 5,339,776 | A | 8/1994 | Regueiro |
| 5,483,807 | A | 1/1996 | Abersfelder et al. |
| 5,537,956 | A | 7/1996 | Rennfeld et al. |
| 5,542,387 | A | 8/1996 | Okubo |
| 5,584,360 | A | 12/1996 | Wedeven |
| 5,604,441 | A | 2/1997 | Freese et al. |
| 5,647,534 | A | 7/1997 | Kelz et al. |
| 5,669,335 | A | 9/1997 | Hollis |
| 5,680,833 | A | 10/1997 | Smith |
| 5,705,742 | A | 1/1998 | Fox et al. |
| 5,992,481 | A | 11/1999 | Smith |
| 6,077,158 | A * | 6/2000 | Lake ............ B60H 1/00278 454/70 |
| 6,124,644 | A | 9/2000 | Olson et al. |
| 6,138,466 | A * | 10/2000 | Lake ............ B60H 1/00278 62/199 |
| 6,186,254 | B1 | 2/2001 | Mufford et al. |
| 6,209,331 | B1 | 4/2001 | Lake et al. |
| 6,213,233 | B1 | 4/2001 | Sonntag et al. |
| 6,216,646 | B1 | 4/2001 | Smith et al. |
| 6,305,345 | B1 | 10/2001 | Bakhtine |
| 6,347,528 | B1 | 2/2002 | Iritani et al. |
| 6,357,541 | B1 | 3/2002 | Matsuda et al. |
| 6,360,835 | B1 | 3/2002 | Skala |
| 6,394,207 | B1 | 5/2002 | Skala |
| 6,448,535 | B1 | 9/2002 | Ap |
| 6,464,027 | B1 | 10/2002 | Dage |
| 6,467,286 | B2 | 10/2002 | Hasebe et al. |
| 6,481,230 | B2 | 11/2002 | Kimishima et al. |
| 6,561,155 | B1 | 5/2003 | Williams |
| 6,569,550 | B2 | 5/2003 | Khelifa |
| 6,575,258 | B1 | 6/2003 | Clemmer |
| 6,651,761 | B1 | 11/2003 | Hrovat et al. |
| 6,708,513 | B2 | 3/2004 | Koehler et al. |
| 6,743,539 | B2 | 6/2004 | Clingerman et al. |
| 6,772,603 | B2 | 8/2004 | Hsu et al. |
| 6,797,421 | B2 | 9/2004 | Assarabowski et al. |
| 7,048,044 | B2 | 5/2006 | Ban et al. |
| 7,104,347 | B2 | 9/2006 | Severinsky et al. |
| 7,147,071 | B2 | 12/2006 | Gering et al. |
| 7,150,159 | B1 | 12/2006 | Brummett et al. |
| 7,191,858 | B2 | 3/2007 | Vanderwees et al. |
| 7,237,634 | B2 | 7/2007 | Severinsky et al. |
| 7,259,469 | B2 | 8/2007 | Brummett et al. |
| 7,591,143 | B2 | 9/2009 | Zeigler et al. |
| 7,591,303 | B2 | 9/2009 | Zeigler et al. |
| 2002/0027027 | A1 | 3/2002 | Skala |
| 2002/0040896 | A1 | 4/2002 | Ap |
| 2003/0193009 | A1 | 10/2003 | Dill |
| 2003/0217876 | A1 | 11/2003 | Severinsky et al. |
| 2005/0115748 | A1 | 6/2005 | Lanier |
| 2005/0133215 | A1 | 6/2005 | Ziehr et al. |
| 2005/0167169 | A1 * | 8/2005 | Gering ............ B60H 1/00278 237/12.3 B |
| 2005/0241865 | A1 | 11/2005 | Varenne |
| 2006/0100057 | A1 | 5/2006 | Severinsky et al. |
| 2006/0231305 | A1 | 10/2006 | Severinsky et al. |
| 2007/0157647 | A1 * | 7/2007 | Duhme ............ B60H 1/00278 62/196.4 |
| 2008/0048457 | A1 | 2/2008 | Patel et al. |
| 2008/0251235 | A1 | 10/2008 | Peng |
| 2009/0024256 | A1 | 1/2009 | Adams et al. |
| 2009/0139781 | A1 | 6/2009 | Straubel |
| 2009/0227194 | A1 | 9/2009 | Johnston |
| 2009/0280395 | A1 | 11/2009 | Nemesh et al. |
| 2010/0012295 | A1 * | 1/2010 | Nemesh ............ B60H 1/00278 165/104.19 |

\* cited by examiner

BATTERY CENTRIC THERMAL MANAGEMENT SYSTEM UTILIZING A HEAT EXCHANGER BLENDING VALVE

CROSS-REFERENCE TO RELATED APPLICATION

This application is a continuation-in-part of U.S. patent application Ser. No. 13/459,112, filed 28 Apr. 2012, which claims the benefit of the filing date of U.S. Provisional Patent Application Ser. No. 61/539,997, filed 28 Sep. 2011, the disclosures of which are incorporated herein by reference for any and all purposes.

FIELD OF THE INVENTION

The present invention relates generally to thermal control systems and, more particularly, to a system for controlling the level of heat rejection from the coolant fluid in a battery cooling system.

BACKGROUND OF THE INVENTION

The thermal management system of an automobile typically utilizes multiple cooling loops, thus providing the desired level of flexibility needed to regulate the temperatures of multiple vehicle subsystems. System complexity may be dramatically increased if the vehicle utilizes an electric or hybrid drive train due to the need to regulate the temperature of the vehicle's battery pack.

FIG. 1 is a high level diagram that illustrates the basic subsystems within the thermal management system 100 of a typical electric vehicle. In general, the thermal management system of such a vehicle includes a refrigeration subsystem 101, a passenger cabin HVAC subsystem 103, and a battery cooling/heating subsystem 105. In an alternate configuration illustrated in FIG. 2, the thermal management system 200 also includes a drive train cooling subsystem 201. Thermal management systems 100 and 200 also include a controller 109. Controller 109 may be a dedicated thermal management system controller, or may utilize the vehicle control system in order to reduce manufacturing cost and overall vehicle complexity.

Refrigeration subsystem 101 is designed to be thermally coupled via one or more heat exchangers to the other thermal subsystems comprising systems 100/200 whenever it is necessary or desirable to reduce the temperature in the thermally-coupled subsystem. As such, in a conventional system the heat exchanger used to couple the refrigeration subsystem 101 to the other thermal subsystems is sized to insure sufficient cooling capacity under maximum thermal loading conditions, i.e., the conditions in which the coolant temperature of the other cooling subsystem(s) is at the highest expected temperature and thermal dissipation requirements are set to the highest possible level. Generally, however, the thermal management system will not be required to provide this level of thermal dissipation. As a result, heat will be extracted from the coolant at a rate much greater than that being input into the coolant by the devices being cooled, leading to a rapid cooling of the coolant and large swings in coolant temperatures between coolant and components, and most importantly large swings in the amount of refrigerant cooling capacity used in reaction to the coolant temperature inside the heat exchanger. In order to avoid such temperature and cooling capacity swings, a conventional thermal management system may regulate the coolant flow rate through the heat exchanger by regulating the coolant pump speed. Alternately, a conventional thermal management system may rely on the self-regulating aspects of the refrigerant thermal expansion valve based on the fixed super-heat setting.

While the conventional approaches of controlling the thermal dissipation provided by the refrigeration system are adequate for many applications, an improved system for controlling thermal loads and thermal dissipation levels is desired. The present invention provides such a thermal management system.

SUMMARY OF THE INVENTION

The present invention provides a thermal management system for use in a vehicle (e.g., an electric vehicle), the system comprising a heat exchanger, a refrigeration system thermally coupled to the heat exchanger, and a coolant loop thermally coupled to the vehicle's battery pack and thermally coupled to the heat exchanger via heat exchanger inlet and outlet ports, where the coolant within the coolant loop is cooled via the heat exchanger and the refrigeration system. The system further comprises a by-pass valve that regulates coolant flow through the heat exchanger, where the by-pass valve is coupled to the coolant loop between the heat exchanger inlet and outlet ports such that the by-pass valve operates in parallel with the heat exchanger. The by-pass valve allows a first portion of the coolant entering the valve to flow through the heat exchanger while a second portion is diverted around the heat exchanger (i.e., by-passes the heat exchanger) and is then recombined with the first portion after the first portion exits the heat exchanger.

In other aspects of the invention, a method of continuously regulating thermal dissipation of a vehicle battery pack is provided, the method including the steps of (a) determining a first temperature corresponding to the vehicle's battery pack, where the battery pack is in thermal communication with a coolant loop, where the coolant loop is coupled to a heat exchanger, where the heat exchanger is in thermal communication with a refrigeration system, where the coolant is chilled as it passes through the heat exchanger by the refrigeration system, and where a by-pass valve coupled to the coolant loop splits the coolant entering the by-pass valve into a first portion that flows through the heat exchanger and a second portion that is diverted around the heat exchanger and recombined with the first portion after the first portion exits the heat exchanger; (b) comparing the first temperature to a first preset range of temperatures; (c) adjusting the by-pass valve to maintain the first temperature within the first preset range of temperatures (e.g., by increasing the first coolant portion and decreasing the second coolant portion if the first temperature is higher than the first preset range of temperatures and by decreasing the first coolant portion and increasing the second coolant portion if the first temperature is lower than the first preset range of temperatures); (d) determining a second temperature corresponding to the vehicle's passenger cabin; (e) comparing the second temperature to a second preset range of temperatures, wherein if the second temperature is higher than the second preset range of temperatures the method further comprises (f) determining if the refrigeration system's compressor output can be increased, and increasing the compressor output if it can be increased and adjusting the by-pass valve to decrease the first portion of coolant and increase the second portion of coolant if the compressor output cannot be increased. The method may further comprise comparing the first temperature to a third preset range of temperatures and adjusting the by-pass valve to increase the first coolant portion and decrease the second coolant portion if the first temperature is higher than the third preset range of temperatures. Once the by-pass valve is set to maximize the first portion of coolant, the method may further comprise setting the refrigeration system to maximize output. Once the refrigeration system is set to maximize output, the method may further comprise cycling a solenoid-controlled thermal expansion valve coupled to the refrigeration system evaporator, e.g., the vehicle cabin evaporator. Evaporator temperature may be monitored so that the solenoid-controlled thermal expansion valve coupled to the refrigeration system evaporator is cycled when the evaporator temperature falls below a preset evaporator temperature. During step (e) if the second temperature is lower than the second preset range of temperatures the method may further comprise decreasing HVAC output, for example by decreasing compressor output.

In another aspect, the first temperature may be determined by monitoring a battery pack temperature sensor or by monitoring coolant temperature, for example monitoring coolant temperature of the first portion of coolant after it exits the heat exchanger and either before or after it recombines with the second portion of coolant.

In another aspect, the second temperature may be determined by monitoring a vehicle cabin temperature sensor or by monitoring an evaporator air outlet temperature sensor corresponding to the vehicle's HVAC system.

In another aspect, after being diverted by the by-pass valve, the second portion of coolant may pass through a radiator before being recombined with the first portion of coolant.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
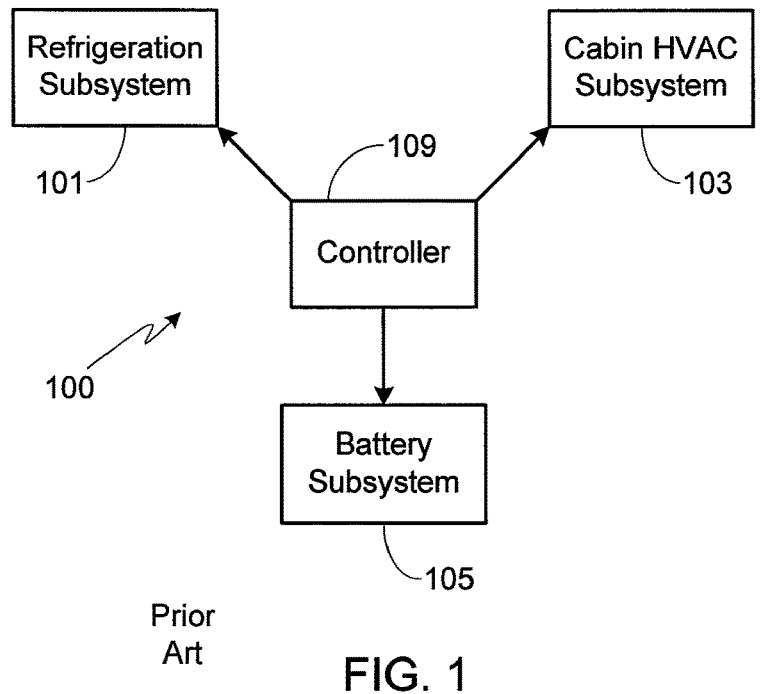
FIG. 1 provides a high level diagram of the various subsystems used in the thermal management system of a typical electric vehicle.
Figure 2:
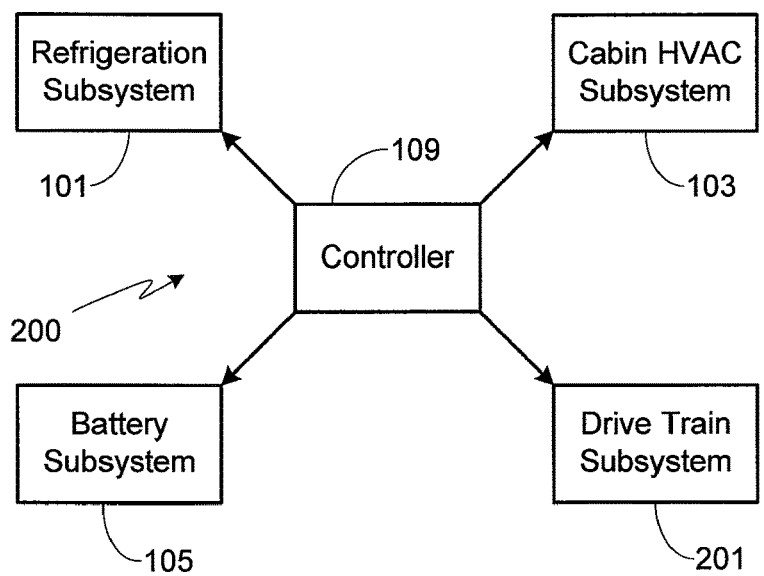
FIG. 2 provides a high level diagram of the various subsystems used in an alternate thermal management system for use in an electric vehicle.
Figure 3:
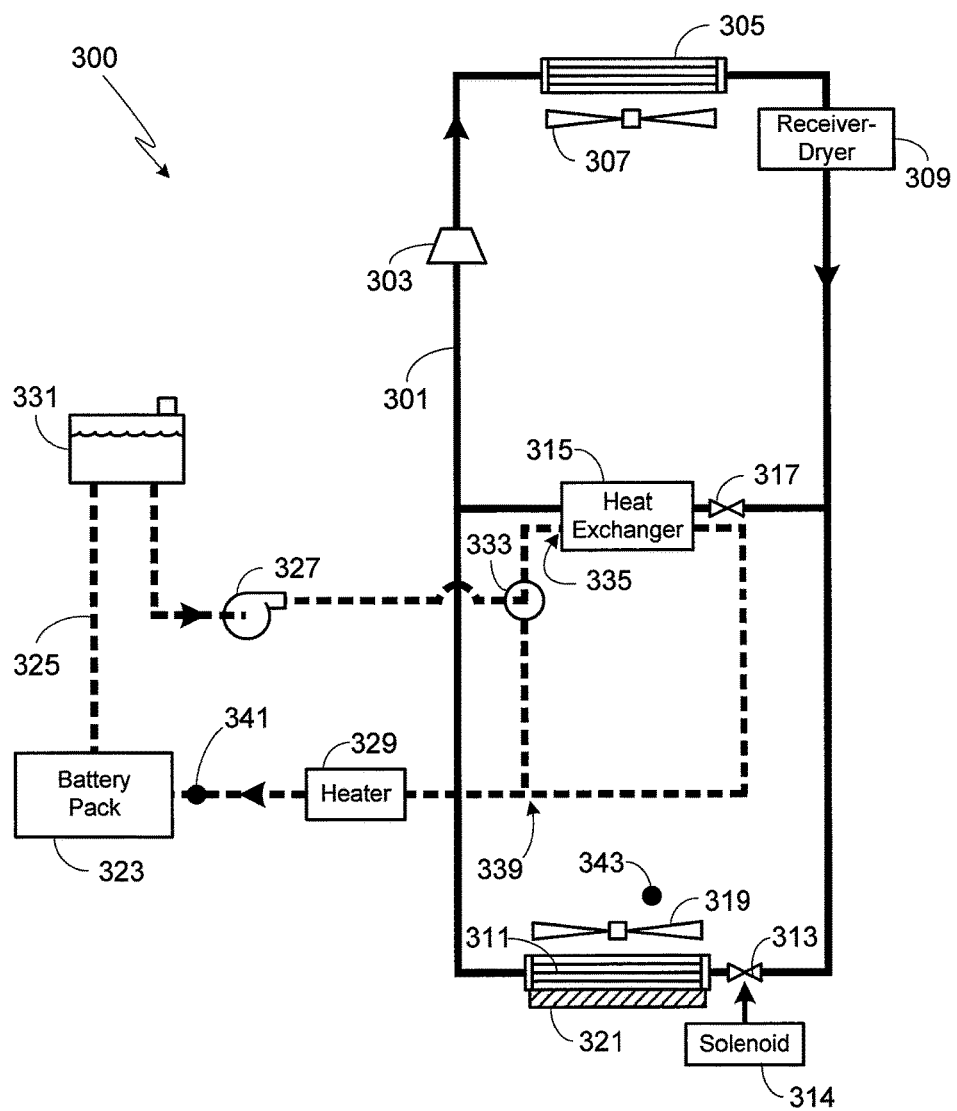
FIG. 3 illustrates a preferred embodiment of the architecture of a thermal management system utilizing the by-pass valve of the current invention.

FIG. 3 illustrates the components associated with an exemplary thermal management system 300 that utilizes the present invention. It should be understood that the invention may be used with other architectures/configurations.

The refrigeration subsystem shown in FIG. 3 uses a gas-phase refrigerant compression system although it will be appreciated that other means (e.g., a thermo-electric cooler) may be used to cool the refrigerated side of the heat exchanger used in conjunction with the battery cooling subsystem. In the illustrated system, the refrigerant (e.g., R134a) is maintained within refrigeration conduit 301. A variable capacity compressor 303 compresses the low temperature refrigerant vapor in the subsystem into a high temperature vapor. The refrigerant vapor then dissipates a portion of the captured heat when it passes through condenser 305, thereby leading to a phase change from vapor to liquid, where the remaining liquid is at a temperature below the saturation temperature at the prevailing pressure. Preferably the performance of condenser 305 is enhanced by using a blower fan 307. The liquid phase refrigerant then passes through a receiver-dryer 309 that removes moisture from the condensed refrigerant. In the preferred embodiment, and as shown, refrigerant line 301 is coupled to a cabin evaporator 311 via a thermal expansion valve 313, and to a heat exchanger 315 (also referred to herein as a chiller) via a thermal expansion valve 317. Thermal expansion valves 313 and 317 control the flow rate of refrigerant into evaporator 311 and chiller 315, respectively. A solenoid 314 is coupled to thermal expansion valve 313 and allows valve 313 to be cycled on and off as necessary, and as described in detail below relative to the preferred methodology of the invention.

The heating, ventilation and cooling (HVAC) subsystem (i.e., subsystem 103) provides temperature control for the vehicle's passenger cabin, typically via a plurality of ducts and vents. Preferably the HVAC subsystem includes one or more fans 319 that are used to circulate air throughout the cabin on demand, regardless of whether the air is heated, cooled, or simply fresh air from outside the vehicle. To provide cool air, refrigerant is circulated through evaporator 311. To provide warm air during normal vehicle operation, the HVAC subsystem may utilize a heater 321, for example an electric heater (e.g., a PTC heater) integrated within evaporator 311. Although not shown, the HVAC subsystem may include means such as a heat exchanger for transferring thermal energy from either drive train subsystem 201 or battery subsystem 105 to the HVAC subsystem.

The battery cooling subsystem (e.g., subsystem 105) includes a battery pack 323 coupled to a coolant loop 325 containing a coolant (i.e., a heat transfer medium such as water). In a typical electric vehicle, battery pack 323 is comprised of a plurality of batteries. One or more circulation pumps 327 pump the coolant through battery pack 323. Circulation pump 327 may utilize a simple on/off operation (i.e., two operational modes), or be varied, for example using pulse width modulation to achieve a range of pump speeds. Heat may be transferred from the battery pack to the coolant via a heat transfer plate, one or more coolant conduits, or other means that are in thermal communication with the batteries within the pack. The coolant contained in loop 325 is cooled via heat transfer with the refrigerant in chiller 315, assuming that the thermostatic valve 317 allows refrigerant from the refrigeration subsystem to pass through chiller 315. Additionally, in a preferred embodiment of the invention cooling loop 325 is also thermally coupled to a heater 329 (e.g., a PTC heater), thus insuring that the temperature of the batteries within battery pack 323 can be maintained within the preferred operating range regardless of the ambient temperature.

In the illustrated embodiment, cooling loop 325 also includes a coolant reservoir 331. Cooling loop 325 may also include a radiator 401, as illustrated in FIG. 4, for discharging heat to the ambient atmosphere.

Figure 4:
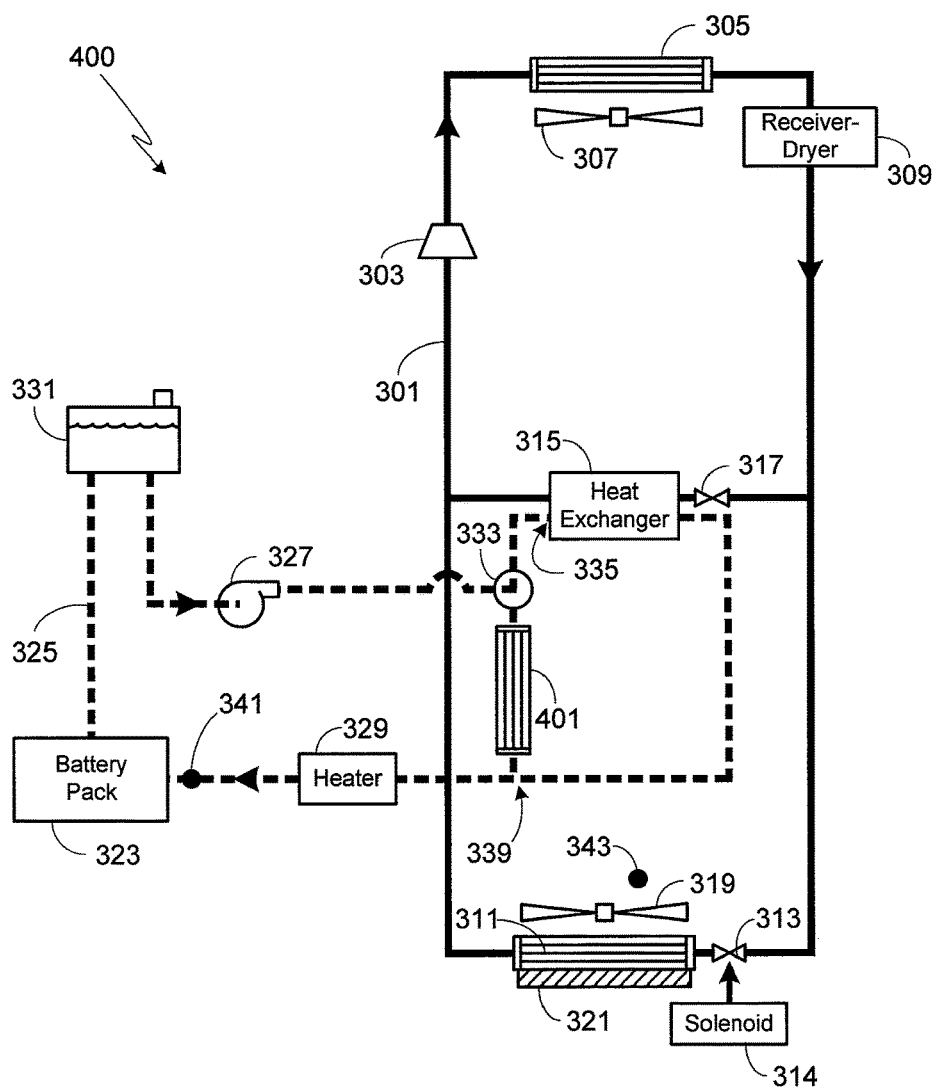
FIG. 4 illustrates an alternate embodiment of the thermal management system shown in FIG. 3, this system including an additional radiator for discharging heat from the battery pack to the ambient environment.

Although not shown in FIG. 3 or 4, as previously noted the thermal management system may be configured to cool various components of the drive train such as the electric motor, and/or cool high heat load electronic components such as the power electronics, inverter and/or charger. These components may be integrated within the battery cooling loop 325 or utilize a dedicated cooling subsystem.

In accordance with the present invention, a by-pass valve 333 is included in cooling loop 325. Valve 333 is located upstream of coolant inlet port 335 of heat exchanger 315, and therefore is placed in parallel with the heat exchanger 315 as shown. As a result of this configuration, the amount of coolant that passes through chiller 315 versus by-passing the chiller altogether, or by-passing the chiller and passing through radiator 401, can be regulated. The coolant that by-passes the heat exchanger is preferably recombined with the chilled coolant exiting the heat exchanger at a junction 339. This approach provides control of coolant side heat rejection to the refrigerant system and allows a fixed coolant temperature to be maintained in response to current thermal load conditions which, in the preferred embodiment, depend on vehicle operating conditions (e.g., battery pack temperature, ambient temperature, etc.).

It will be appreciated that there are numerous techniques that may be used by the control system (e.g., controller 109) to control operation of by-pass valve 333 as well as the other aspects and components of the thermal management system of the invention. In general, the control system uses a plurality of temperature sensors to monitor the temperature within the various vehicle components (e.g., battery pack 323), within one or more regions of the coolant loop(s) (e.g., coolant loop 325), and within one or more locations within the passenger cabin. In response to the monitored temperatures and the desired temperature range for the battery pack, cabin and other vehicle components, the amount of coolant passing through heat exchanger 315 is regulated as is operation of the blower fans (e.g., fans 305 and 319), the heaters (e.g., heaters 321 and 329) and any other controllable features of the thermal system. While operation of the thermal control system may be manually controlled, in the preferred embodiment controller 109 operates automatically based on programming implemented by a processor, either a dedicated processor or a processor utilized in another vehicle management system.

Figure 5A:
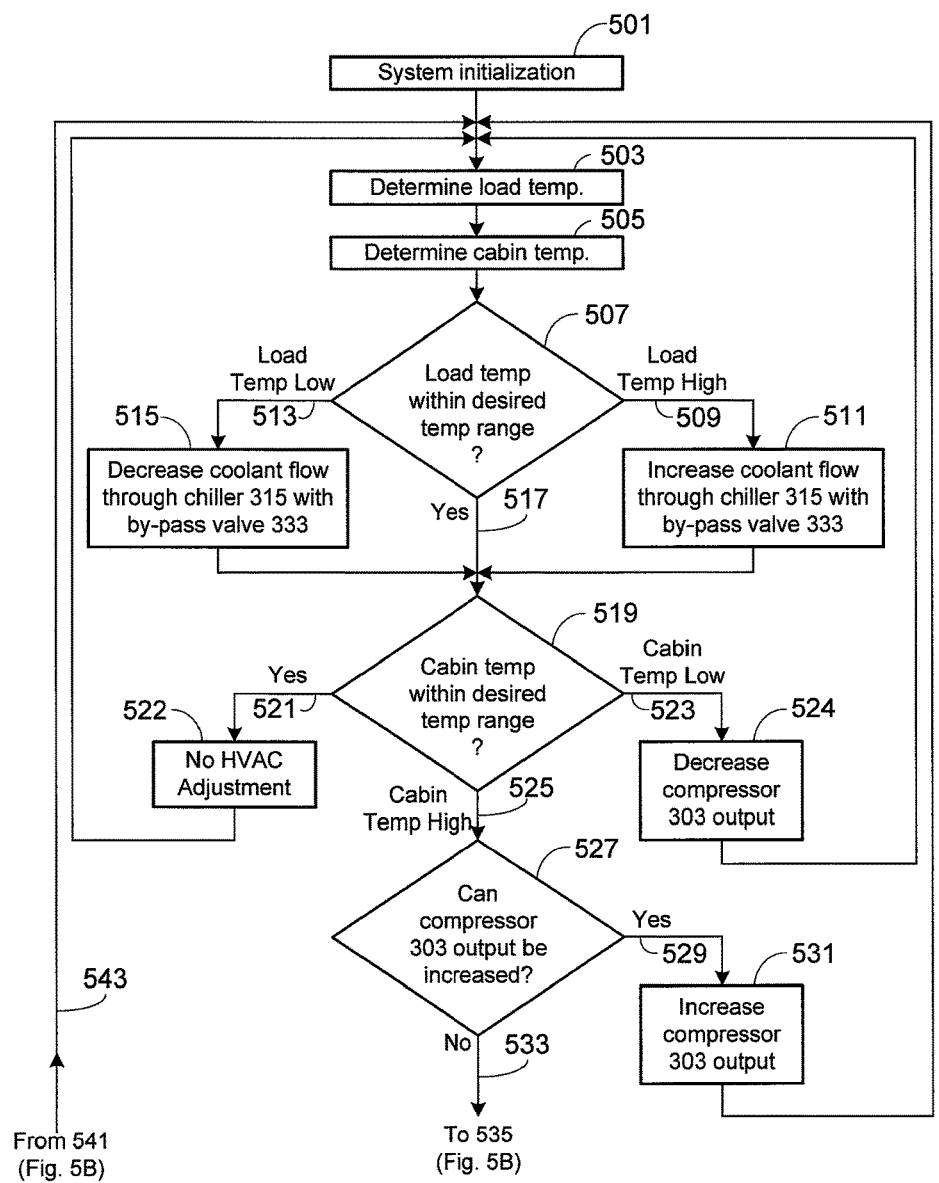
FIGS. 5A and 5B illustrate an exemplary feedback control process for use with the coolant by-pass valve of the invention.
Figure 5B:
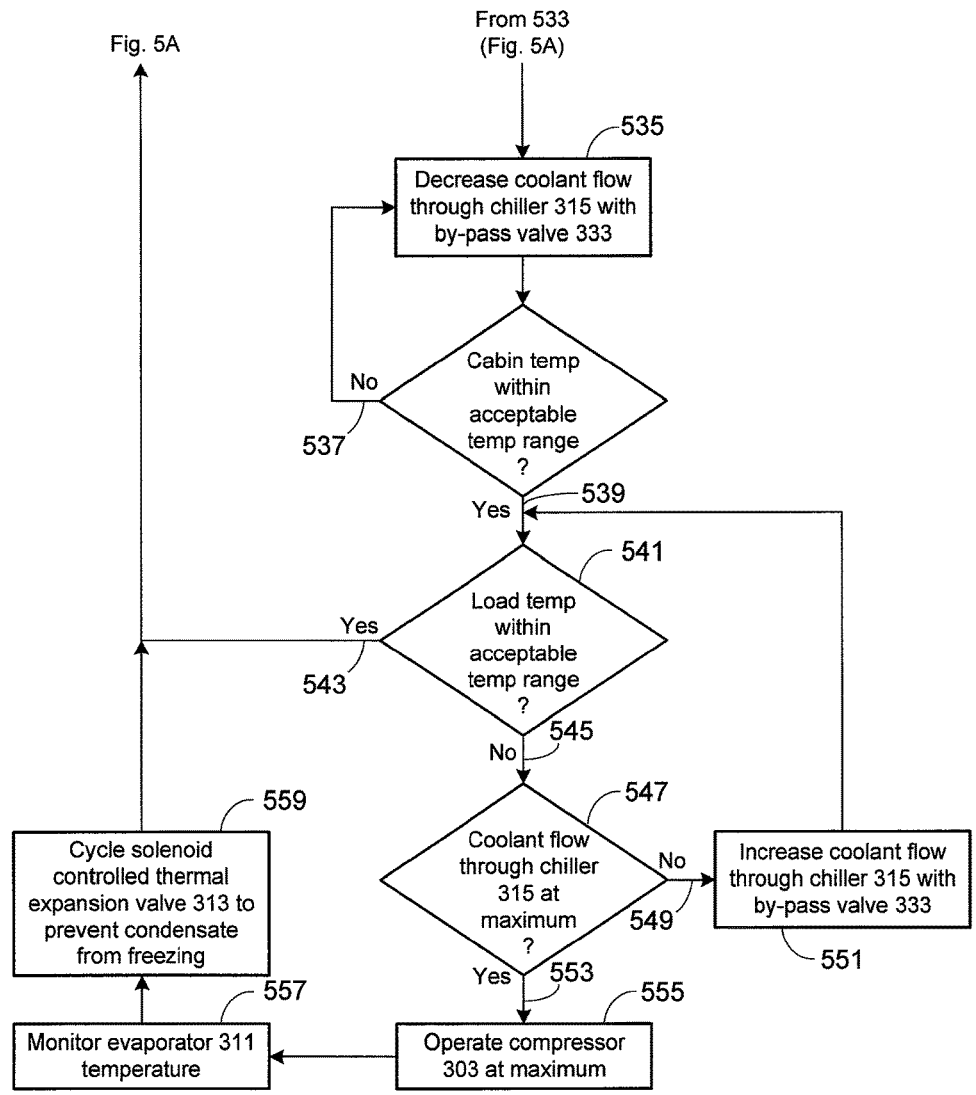

FIGS. 5A and 5B illustrate an exemplary feedback control process for use with by-pass valve 333 and either system 300 or system 400. In the illustrated process, upon system initialization (step 501) the load temperature is determined (step 503). In the preferred embodiment the load temperature refers to the temperature of battery pack 323, although it may also refer to the temperature of various drive train components (e.g., electric motor, power electronics, inverter, charger, etc.) that may be thermally coupled to coolant loop 325. Preferably one or more temperature sensors 341 are used to monitor the temperature of the coolant in the coolant loop that is coupled to the load components of interest (e.g., battery pack 323). Alternately, or in addition to monitoring coolant temperature, the temperature of the load components may be measured directly. Note that in systems 300 and 400, temperature sensor 341 monitors the temperature of the coolant after heat exchanger 315 and before battery pack 323, although coolant temperature at other locations within the coolant loop may be measured such as the temperature of the coolant exiting the battery pack 323. Additionally it will be appreciated that multiple temperature sensors may be used, either to provide redundancy or to allow temperature averaging. In addition to monitoring heat load levels, the system also monitors the temperature within the passenger cabin (step 505), for example using a cabin temperature sensor 343, thus allowing temperature swings within the passenger cabin to be minimized even as the heat load levels applied to the heat exchanger vary.

Initially the load temperature, e.g., the temperature of the coolant within loop 325 as monitored by sensor 341, is compared to a preset temperature or temperature range (step 507). Typically the preset temperature is set by the manufacturer although in some configurations other parties such as a third party service representative may be allowed to set this temperature/temperature range. If the detected temperature is too high relative to the preset temperature/temperature range (step 509), then by-pass valve 333 is opened further (step 511), thus passing more coolant flow through chiller 315. If the detected temperature is too low relative to the preset temperature/temperature range (step 513), then by-pass valve is closed further (step 515), thus diverting more coolant away from chiller 315. If the detected temperature matches the preset temperature or is within the preset temperature range (step 517), then no adjustment is made to the by-pass valve setting.

Next, the cabin temperature (or HVAC system output) is compared to the desired cabin temperature (step 519), where the desired cabin temperature may be input by a user by adjusting a cabin temperature setting or by adjusting a HVAC control setting (e.g., to increase/decrease cabin cooling). If the cabin temperature is acceptable (step 521) then the system does not adjust HVAC output (step 522) and the system continues monitoring load and cabin temperatures. If the cabin temperature is too low (step 523) then the system decreases HVAC output (step 524), for example by decreasing output from compressor 303, and the system continues monitoring load and cabin temperatures. If the cabin temperature is too high (step 525) then the system determines if the output from compressor 303 may be increased (step 527). If compressor output can be increased (step 529), then the system control increases output (step 531) and the system goes back to monitoring load and cabin temperatures. If compressor output cannot be increased (step 533), then coolant flow through chiller 315 is decreased using by-pass valve 333. If the difference between the cabin temperature is still not acceptable (step 537), then coolant flow through chiller 315 is further decreased (step 535).

Once the cabin temperature (or HVAC temperature) is acceptable (step 539), the system determines whether or not the load temperature is still acceptable (step 541) since coolant flow was previously decreased in step 535. If the load temperature is acceptable (step 543), the system goes back to monitoring load and HVAC temperatures. If the load temperature is not acceptable (step 545) due to the decrease in coolant flow, then the system determines if the coolant flow through chiller 315 is operating at full flow (step 547). If it is not (step 549), the coolant flow is increased using by-pass valve 333 (step 551). If the coolant flow through chiller 315 is already at its maximum (step 553), then compressor 303 is operated at its maximum cycle (step 557) regardless of the compressor commands issued by the HVAC system. To prevent the condensate from freezing, the temperature of evaporator 311 is monitored (step 557) and as the temperature of evaporator 311 reaches its freezing point, solenoid 314 cycles thermal expansion valve 313 (step 559).

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A method of regulating thermal dissipation of a battery pack of a vehicle, the vehicle including a coolant loop in thermal communication with the battery pack and coupled to a heat exchanger, the coolant loop including a coolant, the heat exchanger further coupled to and in thermal communication with a refrigeration system utilized in a heating, ventilation and cooling (HVAC) subsystem that controls a cabin temperature of a passenger cabin of the vehicle, and a by-pass valve coupled to the coolant loop upstream of the heat exchanger, the by-pass valve configured to receive the coolant and to regulate a first amount of the received coolant that flows into an inlet port of the heat exchanger and a second amount of the received coolant that is diverted around the heat exchanger and subsequently combined with the first amount of the received coolant that exits an outlet port of the heat exchanger, wherein the heat exchanger operates to lower a temperature of the first amount of the received coolant, the method comprising:
   determining a first temperature, the first temperature corresponding to the battery pack;
   comparing the first temperature to a first preset range of temperatures;
   adjusting the by-pass valve at a first time based on comparing the first temperature to the first preset range of temperatures;
   determining a second temperature, the second temperature corresponding to the cabin temperature;
   comparing the second temperature to a second preset range of temperatures; and
   in response to determining that the second temperature is higher than the second preset range of temperatures and a compressor output corresponding to the refrigeration system cannot be increased, adjusting the by-pass valve at a second time after the first time to decrease the first amount of the received coolant that flows into the inlet port of the heat exchanger and increase the second amount of the received coolant that is diverted around the heat exchanger.

2. The method of claim 1, further comprising:
   determining, at a third time after the second time, a third temperature corresponding to the cabin temperature;
   comparing the third temperature to the second preset range of temperatures; and
   in response to determining that the third temperature is higher than the second preset range of temperatures, further adjusting the by-pass valve to further increase the second amount of the received coolant that is diverted around the heat exchanger.

3. The method of claim 1, further comprising:
   determining, at a third time after the second time, a third temperature corresponding to the cabin temperature and a fourth temperature corresponding to the battery pack;
   comparing the third temperature to the second preset range of temperatures;
   comparing the fourth temperature to the first preset range of temperatures; and
   in response to determining that the third temperature is within the second preset range of temperatures and the fourth temperature is higher than the first preset range of temperatures, further adjusting the by-pass valve to decrease the second amount of the received coolant that is diverted around the heat exchanger.

4. The method of claim 1, further comprising operating the compressor output at an associated maximum cycle.

5. The method of claim 4, further comprising cycling a solenoid-controlled thermal expansion valve coupled to an evaporator of the refrigeration system.

6. The method of claim 5, further comprising monitoring an evaporator air temperature corresponding to the evaporator of the refrigeration system and wherein cycling the solenoid-controlled thermal expansion valve is performed in response to determining that the evaporator air temperature falls below a preset evaporator temperature.

7. The method of claim 1, wherein determining the first temperature comprises monitoring a coolant temperature corresponding to the coolant within the coolant loop.

8. The method of claim 7, wherein monitoring the coolant temperature further comprises monitoring the coolant temperature of the first amount of the received coolant that exits the outlet port of the heat exchanger.

9. The method of claim 7, wherein monitoring the coolant temperature further comprises monitoring the coolant temperature after the heat exchanger and before the battery pack.

10. The method of claim 1, wherein determining the first temperature comprises monitoring a battery pack temperature sensor.

11. The method of claim 1, wherein adjusting the by-pass valve at the first time based on comparing the first temperature to the first preset range of temperatures includes increasing the first amount of the received coolant that flows into the inlet port of the heat exchanger and decreasing the second amount of the received coolant that is diverted around the heat exchanger in response to determining that the first temperature is higher than the first preset range of temperatures.

12. The method of claim 1, wherein determining the second temperature comprises monitoring a vehicle cabin temperature sensor.

13. The method of claim 1, wherein determining the second temperature comprises monitoring an evaporator air outlet temperature sensor.

14. The method of claim 1, further comprising passing the second amount of the received coolant through a radiator before the second amount of the received coolant is recombined with the first amount of the received coolant that exits the outlet port of the heat exchanger.

15. The method of claim 1, further comprising decreasing an HVAC output if the second temperature is below the second preset range of temperatures.

16. The method of claim 15, wherein the HVAC output is decreased by decreasing the compressor output.

17. A thermal management system comprising:
a coolant loop in thermal communication with a battery pack and coupled to a heat exchanger;
a refrigeration system in thermal communication with and coupled to the heat exchanger, the refrigeration system utilized in a heating, ventilation and cooling (HVAC) subsystem that controls a cabin temperature of a passenger cabin of a vehicle;
a coolant within the coolant loop;
a by-pass valve coupled to the coolant loop upstream of the heat exchanger, the by-pass valve configured to receive the coolant and regulate a first amount of the received coolant that flows into an inlet port of the heat exchanger and a second amount of the received coolant that is diverted around the heat exchanger and subsequently combined with the first amount of the received coolant that exits an outlet port of the heat exchanger, wherein the heat exchanger operates to lower a temperature of the first amount of the received coolant;
a first temperature sensor for determining a first temperature corresponding to the battery pack;
a second temperature sensor for determining a second temperature corresponding to the cabin temperature; and
a controller configured to:
compare the first temperature to a first preset range of temperatures;
adjust the by-pass valve at a first time based on comparing the first temperature to the first preset range of temperatures;
compare the second temperature to a second preset range of temperatures; and
in response to determining that the second temperature is higher than the second preset range of temperatures and a compressor output corresponding to the refrigeration system cannot be increased, adjust the by-pass valve at a second time after the first time to decrease the first amount of the received coolant that flows into the inlet port of the heat exchanger and increase the second amount of the received coolant that is diverted around the heat exchanger.

* * * * *